(12) United States Patent
Perumalla et al.

(10) Patent No.: US 12,141,567 B2
(45) Date of Patent: Nov. 12, 2024

(54) ENHANCING APPLICATIONS BASED ON EFFECTIVENESS SCORES

(71) Applicant: INTERNATIONAL BUSINESS MACHINES CORPORATION, Armonk, NY (US)

(72) Inventors: Saraswathi Sailaja Perumalla, Visakhapatnam (IN); Subha Kiran Patnaikuni, Visakhapatnam (IN); Venkata Vara Prasad Karri, Visakhapatnam (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/494,255

(22) Filed: Oct. 5, 2021

(65) Prior Publication Data
US 2023/0105062 A1 Apr. 6, 2023

(51) Int. Cl.
*G06F 8/65* (2018.01)
*G06F 11/34* (2006.01)

(52) U.S. Cl.
CPC ............ *G06F 8/65* (2013.01); *G06F 11/3409* (2013.01)

(58) Field of Classification Search
CPC ................................ G06F 8/65; G06F 11/3409
See application file for complete search history.

(56) References Cited

U.S. PATENT DOCUMENTS

| 8,799,854 B2* | 8/2014 | Meliksetian | G06F 8/36 717/107 |
| 8,813,028 B2* | 8/2014 | Farooqi | G06F 8/34 717/109 |

(Continued)

OTHER PUBLICATIONS

Mell, P. et al., "The NIST Definition of Cloud Computing (Draft)", Sep. 2011, Computer Security Division Information Technology Laboratory National Institute of Standards and Technology, Total 7 pp.

(Continued)

*Primary Examiner* — Lewis A Bullock, Jr.
*Assistant Examiner* — Theodore E Herbert
(74) *Attorney, Agent, or Firm* — KONRAD, RAYNES, DAVDA & VICTOR LLP; Janaki K. Davda

(57) ABSTRACT

Provided are techniques for enhancing applications based on effectiveness scores. Application functionalities of applications in an application landscape are identified. Application logs for the applications are analyzed to identify how the application functionalities are executing. Groups of application functionalities are formed, where each of the groups includes different application functionalities that perform a similar function. For a group of the groups, an effectiveness score is assigned to each of the different application functionalities in that group. For each application functionality, a corresponding recommendation is identified on how that application functionality is to be modified based on the effectiveness score for that application functionality compared to the effectiveness score of each of the other application functionalities in the group. Each application functionality to be modified is automatically updated based on the corresponding recommendation. The applications in the application landscape are executed.

18 Claims, 12 Drawing Sheets

(56) References Cited

U.S. PATENT DOCUMENTS

| | | | |
|---|---|---|---|
| 9,009,649 B2* | 4/2015 | Grechanik | G06F 16/3325 |
| | | | 707/765 |
| 9,047,411 B1* | 6/2015 | Bienkowski | G06F 11/3664 |
| 9,449,042 B1* | 9/2016 | Evans | G06F 8/36 |
| 10,048,945 B1* | 8/2018 | Makkar | G06F 8/33 |
| 10,241,772 B1* | 3/2019 | Ning | G06F 16/24578 |
| 10,310,842 B1* | 6/2019 | Miller | G06F 8/65 |
| 10,732,966 B2* | 8/2020 | Makkar | G06N 5/02 |
| 10,970,067 B1* | 4/2021 | Gupta | G06F 8/20 |
| 2015/0244743 A1* | 8/2015 | Jagad | G06F 21/577 |
| | | | 726/1 |
| 2018/0046525 A1* | 2/2018 | Xuan | G06F 21/54 |
| 2020/0159950 A1* | 5/2020 | Bodin | G06Q 10/101 |

OTHER PUBLICATIONS

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

* cited by examiner

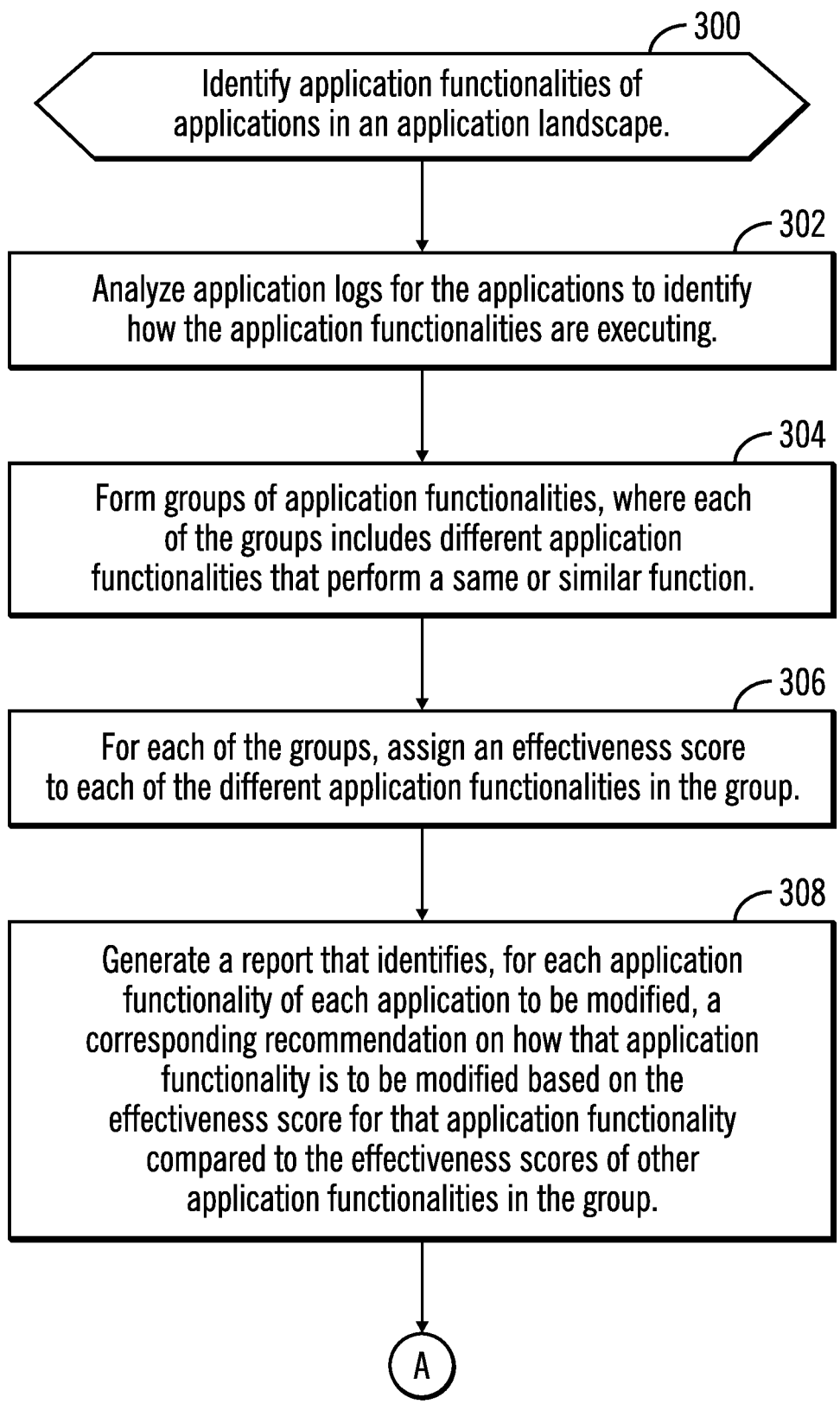

```
┌────────────────────────────────────────────────────────────────────────────┐ ─ 600
│ ┌───────┐  Current log level: ┌──────┬─┐  ☑ Auto-scoll                    │
│ │ Close │                     │DEBUG │▽│                                   │
│ └───────┘                     └──────┴─┘                                   │
│ 23.12.2005 12:53.33.493 [INFO]  Program started.                         ▲ │
│ 23.12.2005 12:53.33.633 [INFO]  Loading bitmaps.                           │
│ 23.12.2005 12:53.33.714 [INFO]  Loading fonts.                             │
│ 23.12.2005 12:53.33.714 [INFO]  Initializing OLE.                          │
│ 23.12.2005 12:53.33.714 [INFO]  Initializing WinSock 2.2                   │
│ 23.12.2005 12:53.33.714 [INFO]  Initializing certificate store.            │
│ 23.12.2005 12:53.34.054 [INFO]  Loading certificates and keys.             │
│ 23.12.2005 12:53.34.054 [INFO]  Initializing command line processor.       │
│ 23.12.2005 12:53.34.064 [INFO]  Loading data sources.                      │
│ 23.12.2005 12:53.34.695 [INFO]  Loading requests.                          │
│ 23.12.2005 12:53.34.695 [INFO]  Restoring request queue.                   │
│ 23.12.2005 12:53.36.237 [INFO]  Starting request processing.               │
│ 23.12.2005 12:53.43.888 [DEBUG] Opening control connection (www.ABC.com=> ip: 81.95.96.94, port: 21) │
│ 23.12.2005 12:53.43.898 [DEBUG] Connected (81.95.96.94:21)                 │
│ 23.12.2005 12:53.43.958 [DEBUG] Opening control connection (www.ABC.com=> ip: 81.95.96.94, port: 21) │
│ 23.12.2005 12:53.43.958 [DEBUG] Connected (81.95.96.94:21)                 │
│ 23.12.2005 12:53.43.958 [DEBUG] Opening control connection (www.ABC.com=> ip: 81.95.96.94, port: 21) │
│ 23.12.2005 12:53.43.958 [DEBUG] Connected (81.95.96.94:21)                 │
│ 23.12.2005 12:53.43.958 [DEBUG] Opening control connection (www.ABC.com=> ip: 81.95.96.94, port: 21) │
│ 23.12.2005 12:53.43.968 [DEBUG] Connected (81.95.96.94:21)                 │
│ 23.12.2005 12:53.43.968 [DEBUG] Opening control connection (www.ABC.com=> ip: 81.95.96.94, port: 21) │
│ 23.12.2005 12:53.43.968 [DEBUG] Connected (81.95.96.94:21)                 │
│ 23.12.2005 12:53.45.511 [DEBUG] Opening data connection (81.95.96.94 => ip: 81.95.96.94, port: 39356) │
│ 23.12.2005 12:53.45.621 [DEBUG] Connected (81.95.96.94:39356)            ▼ │
│                                                                            │
│ ┌────────────────────────────────────────────────────────────┐             │
│ │ Running Loop # 1                                           │             │
│ │ Running Loop # 2                                           │             │
│ │ Running Loop # 3                                           │             │
│ │ Running Loop # 4                                           │             │
│ │ Running Loop # 5                                           │             │
│ │                                                            │             │
│ │ XYZThreads took: 10.011s.                                  │             │
│ │                                                            │ ─ 610
│ │ 1. prettyPrint Result: StopWatch 'XYZThreads' : running time (millis) = 10011 │
│ │ -------------------------------------------                │             │
│ │ ms     %    Task name                                      │             │
│ │ -------------------------------------------                │             │
│ │ 00001  000% XYZThread-1                                    │             │
│ │ 10010  100% XYZThread-2                                    │             │
│ │                                                            │             │
│ │ 2. Short Summary: StopWatch 'XYZThreads' : running time (millis) = 10011 │
│ │ 3. Task Count: 2                                           │             │
│ │ 4. Last Task Name: XYZThread-2                             │             │
│ └────────────────────────────────────────────────────────────┘             │
└────────────────────────────────────────────────────────────────────────────┘
```

FIG. 6A

```
:2016-02-02 11:48:45,391 DEBUG [impl.flow.PubFlowManager] (main) Got ADCTRL Response [lastAck=376
winSz=1]
2016-02-02 11:48:45,391 DEBUG [impl.flow.PubFlowManager] (main) Client AD state is now: lastAcked=376
lastSent=376 winSz=1
2016-02-02 11:48:45,391 DEBUG [MessageProducer] (main) MessageProducer created. Destination: q1
2016-02-02 11:48:45,391 DEBUG [Session] (main) Leaving createProducer()
2016-02-02 11:48:45,395 DEBUG [MessageProducer] (main) Entering send()
2016-02-02 11:48:45,395 DEBUG [MessageProducer] (main) Entering sendMessage. Destination: q1  delivery
mode: 2  priority: 4  timeToLive: 0
2016-02-02 11:48:45,414 DEBUG [impl.MessageProducer] (main) About to send message
2016-02-02 11:48:45,414 DEBUG [impl.MessageProducer] (main) add AD message to unacked pub message list
2016-02-02 11:48:45,414 DEBUG [protocol.impl.TcpClientChannel] (main) [Session[user1@tcp://vmr4:55555]
(0002)] Want to send:
impl.GenericXMLMessage[messageID=377,ackMessageId=0,prevId=376,CID_count=0,destinationName=,user
Data=,type=PERSISTENT,priority=0,redelivered=false,timeToLive=0,expiration=0,dmqEligible=false,
topicSeqNum=null,metadataLen=0,contentLen=0,attLen=29,deliverToOne=false,ackImmediately=false,
sendCount=0]
2016-02-02 11:48:45,415 DEBUG [protocol.impl.TcpClientChannel] (main) [Session[user1@tcp://vmr4:55555]
(0002)] encoded to bufs: 377
2016-02-02 11:48:45,415 DEBUG [impl.PubADManager] (main) Starting pub ad timer: scheduled new timer in
2000
2016-02-02 11:48:45,416 ERROR [impl.MessageProducer] (Context_2_ReactorThread) Error Response (503) -
Queue Shutdown - Topic - '#P2P/QUE/q1'
2016-02-02 11:48:45,419 DEBUG [impl.MessageProducer] (Context_2_ReactorThread) Got response for AD
msg:377
2016-02-02 11:48:45,419 DEBUG [impl.ADManager] (Context_2_ReactorThread) Clear AD timer
2016-02-02 11:48:45,419 DEBUG [impl.PubADManager] (Context_2_Reactor Thread) Processing windowed error
ackid=377, ackEventCode=SUPPORTED_ACK_EVENT_MODE_PER_MSG
2016-02-02 11:48:45,419 DEBUG [impl.PubADManager] (Context_2_Reactor Thread) Processing windowed ack
ackid=376, ackEventCode=SUPPORTED_ACK_EVENT_MODE_PER_MSG
2016-02-02 11:48:45,420 DEBUG [impl.PubADManager] (Context_2_Reactor Thread) Windowed ack for:
msg=376
2016-02-02 11:48:45,422 DEBUG [protocol.nio.impl.Producer.Notification.Dispatcher]
(Context_2_ProducerDispatcher) Producer dispatcher thread starts
2016-02-02 11:48:45,422 DEBUG [impl.PubADManager] (Context_2_ReactorThread) Windowed error for:
msg=377
2016-02-02 11:48:45,423 DEBUG [protocol.nio.impl.ProducerErrorNotification] (Context_2_ProducerDispatcher)
Notify exception during publishing 377: 503: Queue Shutdown
- Topic '#P2P/QUE/q1'
2016-02-02 11:48:45,423 INFO    [Connection] (Context_2_ProducerDispatcher) Entering handleErrorEx().
Message: 503: Queue Shutdown - Topic '#P2P/QUE/q1'
:
```

FIG. 6B

ENHANCING APPLICATIONS BASED ON EFFECTIVENESS SCORES

BACKGROUND

Embodiments of the invention relate to enhancing applications based on effectiveness scores. Certain embodiments of the invention relate to comparative effectiveness score based application functionality enhancement recommendations.

An application landscape may be described as a set of applications that communicating with each other to perform various activities.

In an application landscape, there may be many applications, and each of the applications may have one or more functionalities. The applications communicate with each other in upstream and downstream relationships. It is possible that some of the functionalities of an application in the application landscape wait for manual input (e.g., user input) or manual execution (e.g., a user invokes execution), and other of the functionalities may be executed automatically. When a new functionality is developed for an application, then that functionality is deployed in the application landscape on a production system.

SUMMARY

In accordance with certain embodiments, a computer-implemented method is provided for enhancing applications based on effectiveness scores. The computer-implemented method comprises operations. Application functionalities of applications in an application landscape are identified. Application logs for the applications are analyzed to identify how the application functionalities are executing. Groups of application functionalities are formed, where each of the groups includes different application functionalities that perform a similar function. For a group of the groups, an effectiveness score is assigned to each of the different application functionalities in that group. For each application functionality, a corresponding recommendation is identified on how that application functionality is to be modified based on the effectiveness score for that application functionality compared to the effectiveness score of each of the other application functionalities in the group. Each application functionality to be modified is automatically updated based on the corresponding recommendation. The applications in the application landscape are executed.

In accordance with other embodiments, a computer program product is provided for enhancing applications based on effectiveness scores. The computer program product comprises a computer readable storage medium having program code embodied therewith, the program code executable by at least one processor to perform operations. Application functionalities of applications in an application landscape are identified. Application logs for the applications are analyzed to identify how the application functionalities are executing. Groups of application functionalities are formed, where each of the groups includes different application functionalities that perform a similar function. For a group of the groups, an effectiveness score is assigned to each of the different application functionalities in that group. For each application functionality, a corresponding recommendation is identified on how that application functionality is to be modified based on the effectiveness score for that application functionality compared to the effectiveness score of each of the other application functionalities in the group. Each application functionality to be modified is automatically updated based on the corresponding recommendation. The applications in the application landscape are executed.

In accordance with yet other embodiments, a computer system is provided for enhancing applications based on effectiveness scores. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Application functionalities of applications in an application landscape are identified. Application logs for the applications are analyzed to identify how the application functionalities are executing. Groups of application functionalities are formed, where each of the groups includes different application functionalities that perform a similar function. For a group of the groups, an effectiveness score is assigned to each of the different application functionalities in that group. For each application functionality, a corresponding recommendation is identified on how that application functionality is to be modified based on the effectiveness score for that application functionality compared to the effectiveness score of each of the other application functionalities in the group. Each application functionality to be modified is automatically updated based on the corresponding recommendation. The applications in the application landscape are executed.

BRIEF DESCRIPTION OF THE SEVERAL VIEWS OF THE DRAWINGS

Referring now to the drawings in which like reference numbers represent corresponding parts throughout:

FIGS. 3A and 3B illustrate, in a flowchart, operations for enhancing application functionalities in accordance with certain embodiments.

FIGS. 6A and 6B illustrate various application logs in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
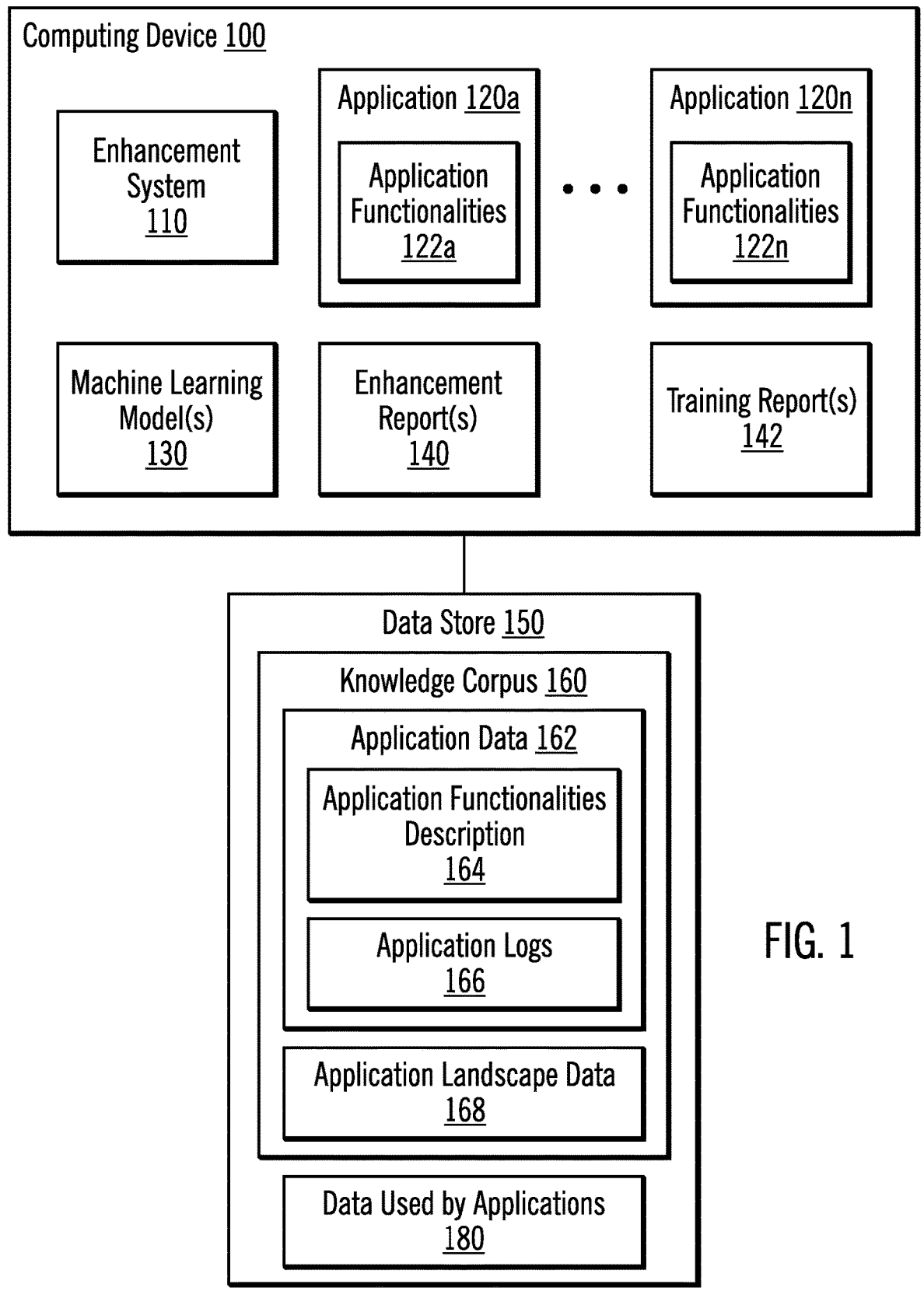
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is connected to a data store 150 either directly or via a network. The computing device 100 includes an enhancement system 110 (for enhancing application functionalities), applications 120a . . . 120n, one or more machine learning models 130, and one or more reports. Each of the applications 120a . . . 120n has one or more functionalities 122a . . . 122n. Each of the functionalities 122a . . . 122n may be described as code that is written to implement a functional. The computing device 100 includes one or more machine learning models 130, one or more enhancement reports 140, and one or more training reports 142.

The data store 150 includes a knowledge corpus 160 and data used by applications 180 (i.e., input data for the applications from various sources (data stores, databases, other applications, etc.)). The knowledge corpus 160 includes application data 162 for one or more applications 120a . . . 120n and application landscape data 168 for one or more application landscapes. The application data 162 includes application functionalities data 164 on the application functionalities 122a . . . 122n of each of the applications 120a . . . 120n. Application functionalities 122a . . . 122n may be described as functions that are implemented in code, which is executed to perform functions (i.e., activities or operations). The application data 162 also includes application logs 166.

An application landscape may be described as a set of the applications 120a . . . 120n that are communicating with each other to perform various functions.

In certain embodiments, the application data 162, the application landscape data 168, and the application logs 166 for applications are input into a machine learning model 130, which outputs a report 140. In certain embodiments, the report 140 indicates which of the application functionalities 122a . . . 122n of each of the applications 120a . . . 120n may be enhanced and provides information on how to perform the enhancement (e.g., replace a particular application functionality in an application with updated application functionality code).

The enhancement system 110 analyzes the application log and the application functionalities to identify how different application functionalities are being executed in the different applications in an application landscape. For example, the enhancement system 110 determines where manual intervention is provided, where and when particular functions are performed in an effective manner, etc. Then, the enhancement system 110 identifies which application functionalities of each of the applications in the application landscape provide a most effective way of performing those application functionalities. The enhancement system 110 recommends suggestions on how to enhance (upgrade) to a target application. For example, if a first application includes a first application functionality that is performing function X with manual intervention, while a second application has a second application functionality that is performing the function X automatically, the enhancement system 110 recommends that the first application functionality be updated to use the second application functionality (code). In certain embodiments, the enhancement system 110 automatically updates the first application code with the code for the second application functionality so that the first application may be executed more efficiently (without manual intervention).

An application development lifecycle includes a requirements phase (in which requirements for the application are collected, a design phase (in which the application is designed), a development phase (in which the application is developed by an application development team), and a validation phase (in which the developed application is validated against the requirements) with re-iterative processing based on feedback (e.g., received from an end user).

In an application landscape with multiple applications, there may be a dedicated application development team, for each application. In such a case, the application development teams may communicate with each other if there is a relationship among the applications (e.g., immediate upstream or downstream applications), otherwise, one application development team may not know what another application development team is developing. This leads to multiple applications including the same or similar application functionalities or one application including an application functionality that may be reused by another application in the application landscape with minor modification. The enhancement system 110 is able to identify that the same or similar application functionalities are being used in multiple applications in an application landscape and update each of the applications to use the most efficient application functionality. The enhancement system 110 is also able to update an application functionality with, for example, a minor modification, to improve that application functionality in a particular application.

The enhancement system 110 analyzes the application log, application functionalities, and associated dependency with other internal and external applications. The enhancement system 110 identifies how different application functionalities are being executed in the different applications in the application landscape. The enhancement system 110 identifies which application functionalities of each application in the application landscape are the most effective in performing functions and recommends updates to other applications in the application landscape to improve overall efficiency of execution in the application landscape.

The application landscape may be described as the set of applications that interact and/or are dependent on each other. In certain embodiments, an application is related to upstream applications (which may perform processing before the application and/or may process and output data that is input to the application) and downstream applications (which may perform processing after the application and/or may process data that the application output). In certain embodiments, the application landscape may also include services and data (e.g., in data stores) that the applications interact with.

Figure 2:
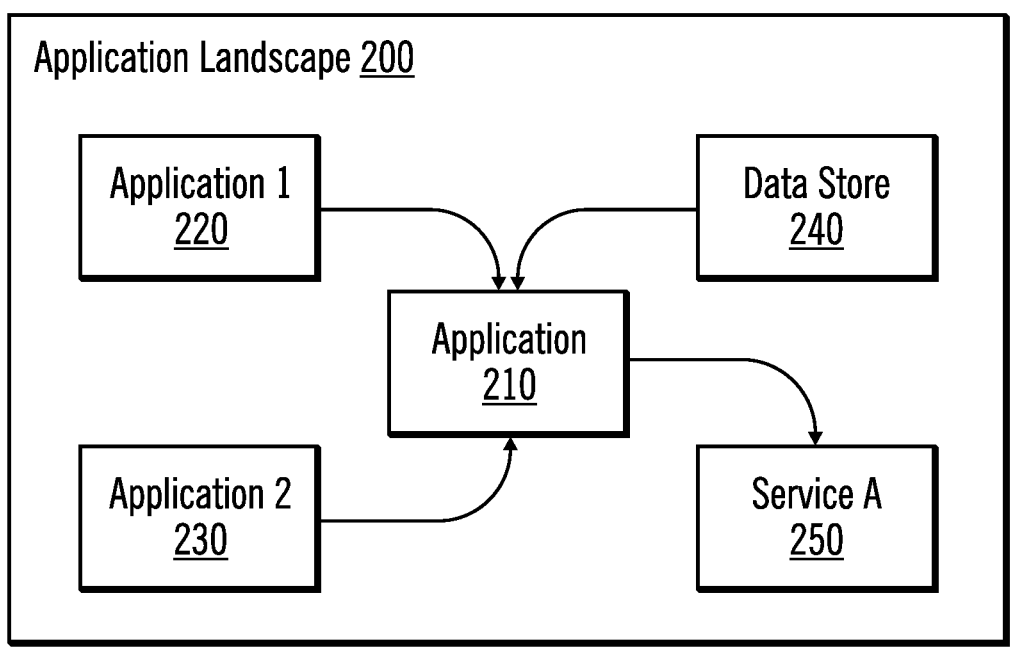
FIG. 2 illustrates, in a block diagram, an application landscape in accordance with certain embodiments.

FIG. 2 illustrates, in a block diagram, an application landscape 200 in accordance with certain embodiments. In the application landscape 200, an application 210 receives input from Application1 220, Application2 230, and Data Store 240. Then, the application 210 does some processing on the input and sends output to ServiceA 250. In certain embodiments, the application landscape 200 may also show services invoked by the applications and data that is input to or output by the applications.

Figure 3B:
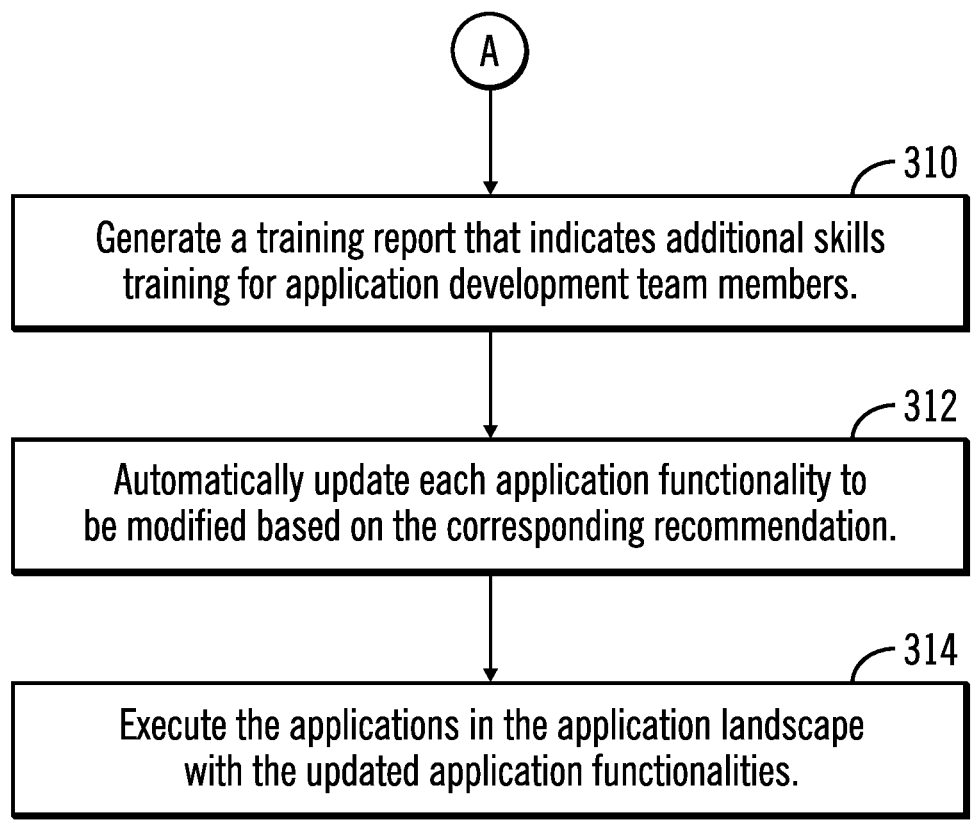

FIGS. 3A and 3B illustrate, in a flowchart, operations for enhancing application functionalities in accordance with certain embodiments. Control begins at block 300 with the enhancement system 110 identifying application functionalities of applications in an application landscape. In certain embodiments, this may be done by accessing the application functionalities description. In other embodiments, the application functionalities may be identified by analyzing the application logs.

In block 302, the enhancement system 110 analyzes application logs for the applications to identify how the application functionalities are executing. This may be done by accessing the application logs 166 and the application landscape data 168 (which may indicate dependencies among the application functionalities, which data sources each of the applications use, etc.). In certain embodiments, the enhancement system 110 analyzes the application logs of the applications to identify a time of execution of different application functionalities in different applications, a data volume (e.g., of how much data each of the application functionalities receives as input, processes and/or outputs), infrastructure configuration, application configuration, application workflow, cloud plan (e.g., that indicates which data is stored in the cloud), etc. Then, the enhancement system 110 may recommend infrastructure modification to improve the effectiveness score of the application functionality.

In block 304, the enhancement system 110 forms groups of application functionalities, where each of the groups includes different application functionalities that perform a same (or similar) function. For example, there may be one group with application functionalities that move data from a first data storage to a second data storage (with different code implementations), and there may be another group with application functionalities that identify data to be deleted (e.g., based on the data being more than a certain number of years old) and delete that data (with different code implementations).

In block 306, for each of the groups, the enhancement system 110 assigns an effectiveness score to each of the different application functionalities in that group. In certain embodiments, the effectiveness score may be calculated based on data gathered on time of execution (e.g., how quickly an application functionality is executed to perform the activity), a data volume (e.g., of how much data each of the application functionalities receives as input, processes and/or outputs), types of data (e.g., billing data, traffic data, etc.), activities (operations) to complete the functionality, manual involvement (to complete a function of that application functionality) versus automated (to automatically complete the function of that application functionality), number of mistakes, number of times the application functionality completed successfully, number of times the application functionality failed, etc.

In certain embodiments, the enhancement system 110 historically analyzes the application log to identify execution patterns and to correlate the execution patterns with respective application functionalities. In this manner, the enhancement system 110 identifies how different application functionalities are executed by different applications. The enhancement system 110 compares how different implementations of the same or similar application functionalities are executed and calculates an effectiveness score of these different implementations.

In block 308, the enhancement system 110 generates an enhancement report that identifies, for each application functionality of each application to be modified, a corresponding recommendation on how that application functionality is to be modified based on the effectiveness score for that application functionality compared to the effectiveness scores of other application functionalities in the group. From block 308 (FIG. 3A), processing continues to block 310 (FIG. 3B).

In certain embodiments, the enhancement system 110 also identifies the applications with application functionalities involving different types of manual intervention and indicates how the same or similar application functionalities are automatic in other applications in the application landscape. The enhancement system 110 includes a recommendation, in the enhancement report, on which application functionalities may be automated (i.e., programmatically controlled) to avoid manual intervention. For example, the enhancement system 110 may determine that a certain report is manually generated once a month, and the enhancement system 110 recommends that this report be automatically generated once a month. With embodiments, the enhancement system 110 also implements this automatic application functionality.

In certain embodiments, the enhancement system 110 considers application functionalities, implementation technologies, etc., and accordingly recommends appropriate portions of the code for the application functionality that may be reused (i.e., copied from another application) or recommends a similar design that may be followed so that an application functionality with a comparatively lower effectiveness score may be upgraded. The enhancement system 110 may automatically update the application functionality with the appropriate portion of the code. For example, if an application functionality is coded with an earlier version of software, the recommendation may be to update the application functionality with a newer version of that software.

In block 310, the enhancement system 110 generates a training report that indicates additional skills training for application development team members. In certain embodiments, based on the effectiveness score of different application functionalities in the application landscape, the enhancement system 110 provides recommendations to an application development team on how application functionalities with a comparatively lower effectiveness score may be improved. The enhancement system 110 may also identify the application functionalities of other applications, with comparatively higher effectiveness scores, that may be referenced to improve the application. Thus, in certain embodiments, some subset of application functionalities with comparatively lower (below a threshold) effectiveness scores are identified for modification, while another subset of application functionalities with comparatively higher (above a threshold) effectiveness scores are identified for reference (e.g., the code of these application functionalities may be used to update the code of application functionalities in the group with comparatively lower effectiveness scores.

In certain embodiments, based on the identified skills of the development team members, the effectiveness scores of different application functionalities in the application landscape that the development team members worked on, the technology used in different application functionalities, etc., the enhancement system 110 recommends appropriate training to the different development team members so that their skills improve and in future, they will code application functionalities with comparatively higher effectiveness score functionalities.

In block 312, the enhancement system 110 automatically updates each application functionality (that has been determined is to be modified) based on the corresponding recommendation (e.g., by updating code).

In block 314, the enhancement system 110 executes the applications in the application landscape with the updated application functionalities.

In certain embodiments, the enhancement system 110 provides recommendations for developing common application functionalities, such as a document conversion service or a file check (e.g., an antivirus scan common Application Programming Interface (API)), which would be common across multiple applications.

Figure 4:
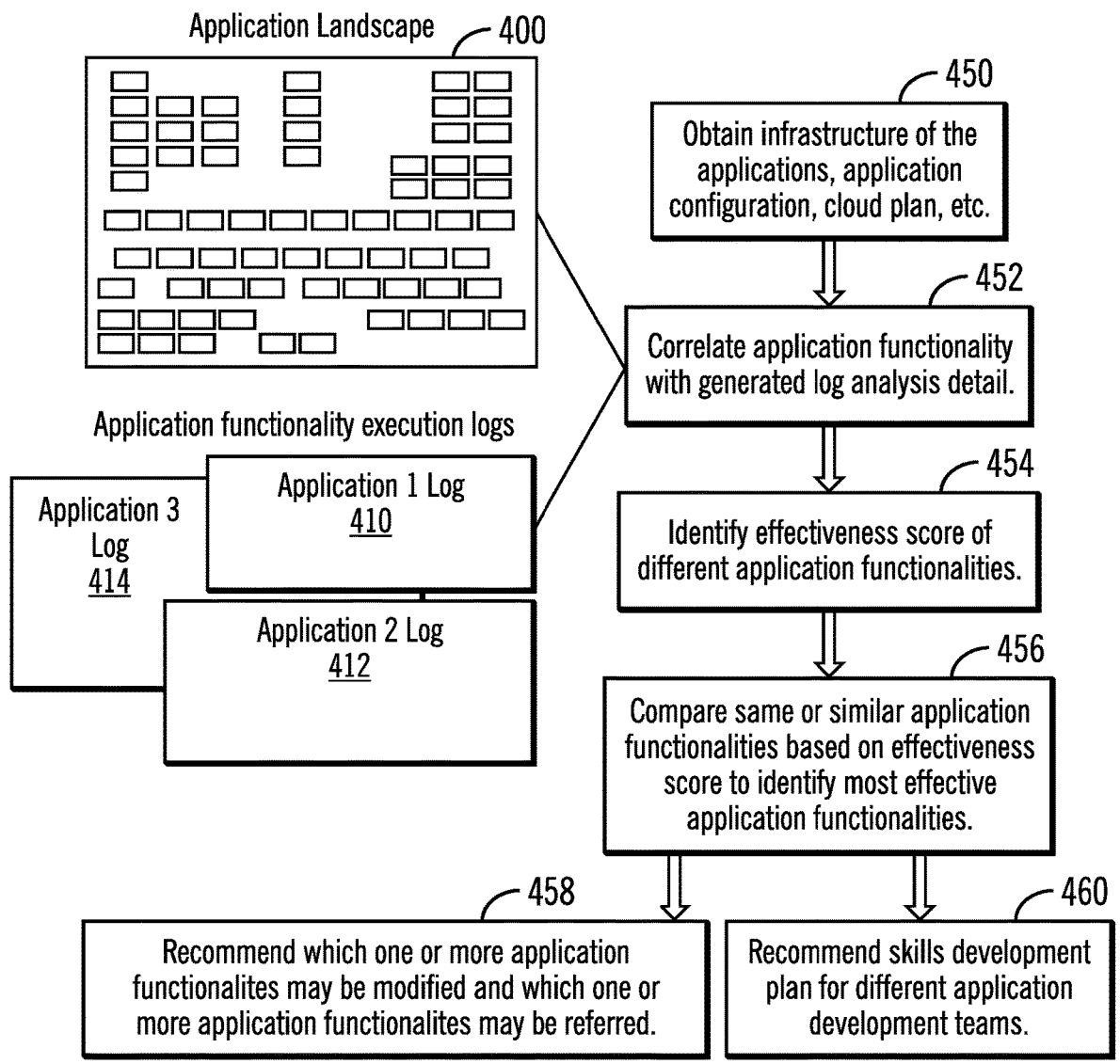
FIG. 4 illustrates generation of recommendations in accordance with certain embodiments.

FIG. 4 illustrates generation of recommendations in accordance with certain embodiments. In FIG. 4, there is an application landscape 400, which includes Application 1, Application 2, and Application 3 (along with other applications, services, and data sources). There are application functionality execution logs, which include an Application 1 Log 410 for Application 1, an Application 2 Log 412 for Application 2, and an Application 3 Log 414 for Application 3.

Starting with block 450, the enhancement system 110 obtains infrastructure of the applications, application configuration, cloud plan, etc. In block 452, the enhancement system 110 correlates the application functionalities with the generated log analysis detail by using the application landscape 410 and the logs 410, 412, 414, along with the data obtained in block 450. In block 454, the enhancement system 110 identifies the effectiveness score of different application functionalities. Thus, the enhancement system 110 gathers the application logs from each of the applications in the application landscape, identifies the effectiveness score of different application functionalities, In block 456, the enhancement system 110 compares the same or similar application functionalities based on effectiveness score to identify most effective application functionalities. In block 458, the enhancement system 110 recommends which application functionality may be modified and which application functionality may be referred (e.g., by other application functionalities that are to be modified). In certain embodiments, a most effective application functionality in a group is one that may be referred to or referenced by the other application functionalities in the group. In block 460, the enhancement system 110 recommends a skills development plan for different application development teams.

Figure 5:
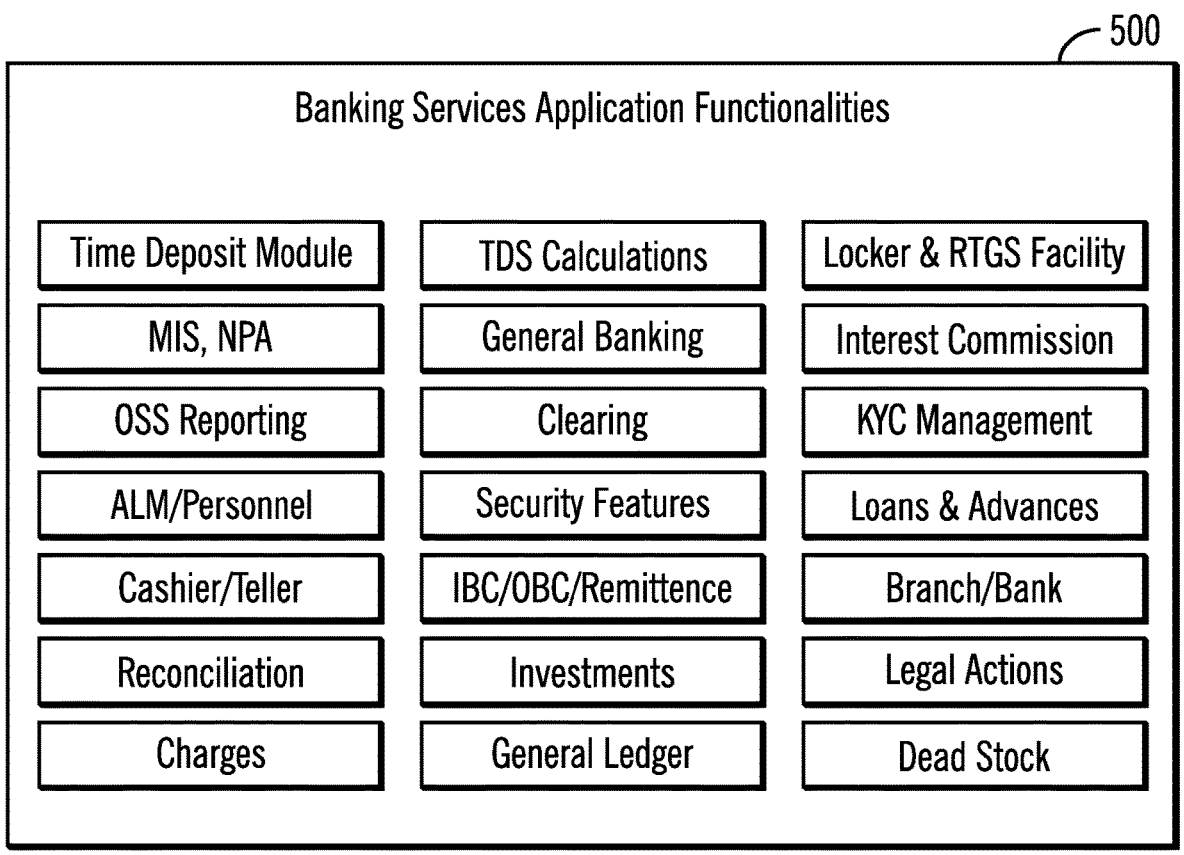
FIG. 5 illustrates banking services application functionalities in accordance with certain embodiments.

FIG. 5 illustrates banking services application functionalities 500 in accordance with certain embodiments. For example, the banking services application functionalities 500 include a time deposit module application functionality, an investments application functionality, a branch/bank application functionality. An application may include one or more of these application functionalities 500.

FIGS. 6A and 6B illustrate various application logs 600, 610, 620 in accordance with certain embodiments. For example, application log 600 illustrates DEBUG. As another example, application log 610 illustrates a running time. As a further example, application log 620 illustrates date, time, and other information for each of the log entries.

In certain embodiments, in the application landscape, different applications are identified uniquely. Also, the application functionalities of each of the applications are identified uniquely. The application functionalities of an application are associated with that application and may be associated with a description of the activities (functions or operations) performed by that functionality. In certain embodiments, the application functionalities may be correlated with business requirements and how the requirement is executed.

In certain embodiments, the enhancement system 110 identifies the technologies that have been used for developing different applications in the application landscape.

Each application in the application landscape generates an application log when that application is executed, and the application functionalities that are executed are captured in the application log.

In certain embodiments, the enhancement system 110 receives the application logs from each of the applications. The enhancement system 110 also captures the infrastructure information for each application. In certain embodiments, the enhancement system 110 historically analyzes the application logs generated by different applications and identifies different application functionalities of the different applications.

The enhancement system 110 correlates the application log with different functionalities of the applications.

Based on the analysis of the application log, the enhancement system 110 identifies the data volume, time to execute, operations to complete each application functionality, etc.

The enhancement system 110 may also analyze the requirement specifications of different application functionalities in the application landscape.

The enhancement system 110 identifies the effectiveness score of the different application functionalities in the application landscape. The enhancement system 110 identifies which application functionalities are similar (i.e., perform similar functions, activities or operations). In particular, the enhancement system 110 identifies application functionalities having similar functions for different applications (e.g., an application functionality of a medical bill approval process in a first application and an application functionality for a supplier payment bill approval in a second application are deemed to be similar).

The enhancement system 110 compares the effectiveness score of each of the application functionalities that are similar. Based on the comparison, the enhancement system 110 identifies which application functionality may be considered a reference (for other application functionalities) and which application functionalities are to be modified (e.g., based on the reference).

In certain embodiments, the enhancement system 110 notifies the application development team of the respective applications to update (upgrade) the application functionalities so that the effectiveness of the application may be improved. In other embodiments, the enhancement system 110 automatically updates the application functionalities.

The enhancement system 110 may also compare the infrastructure detail of different applications and recommend improvements to the infrastructure to improve effectiveness of the application.

Based on the comparative analysis of application functionality effectiveness, the enhancement system 110 may also recommend additional skills for the application development team.

In certain embodiments, application development and deployment have different phases. When a developer is building an application, execution and performance of a code block depends on the way the logic is written, variables used, best practices followed, and on system configuration (e.g., processor and memory available). In certain embodiments, the enhancement system 110 calculates the effectiveness score in the development local machine or virtual machine and may also calculate the effectiveness score in the production instance.

With historical learning, the enhancement system 110 may identify an optimal effectiveness score for each application functionality, may identify an optimal effectiveness score for each developer, and/or may identify an optimal effectiveness score for each combination of application functionality and developer. Then, there may also be thresholds so that the effectiveness score calculated is compared to the threshold to ensure that the application functionality to ensure the code of that application functionality executes in the production environment (with a large amount of live data) with little to no adverse effect on performance of data retrieval or data display.

The enhancement system 110 may provide the effectiveness score for use in a code review phase to ensure optimal code is being delivered. This also helps train and guide the application development team members.

For example, if there is a requirement to perform an application functionality in 3 seconds in the production environment, the enhancement system 110 suggests that the application functionality execute in 10 milliseconds in the production environment.

Figure 7:
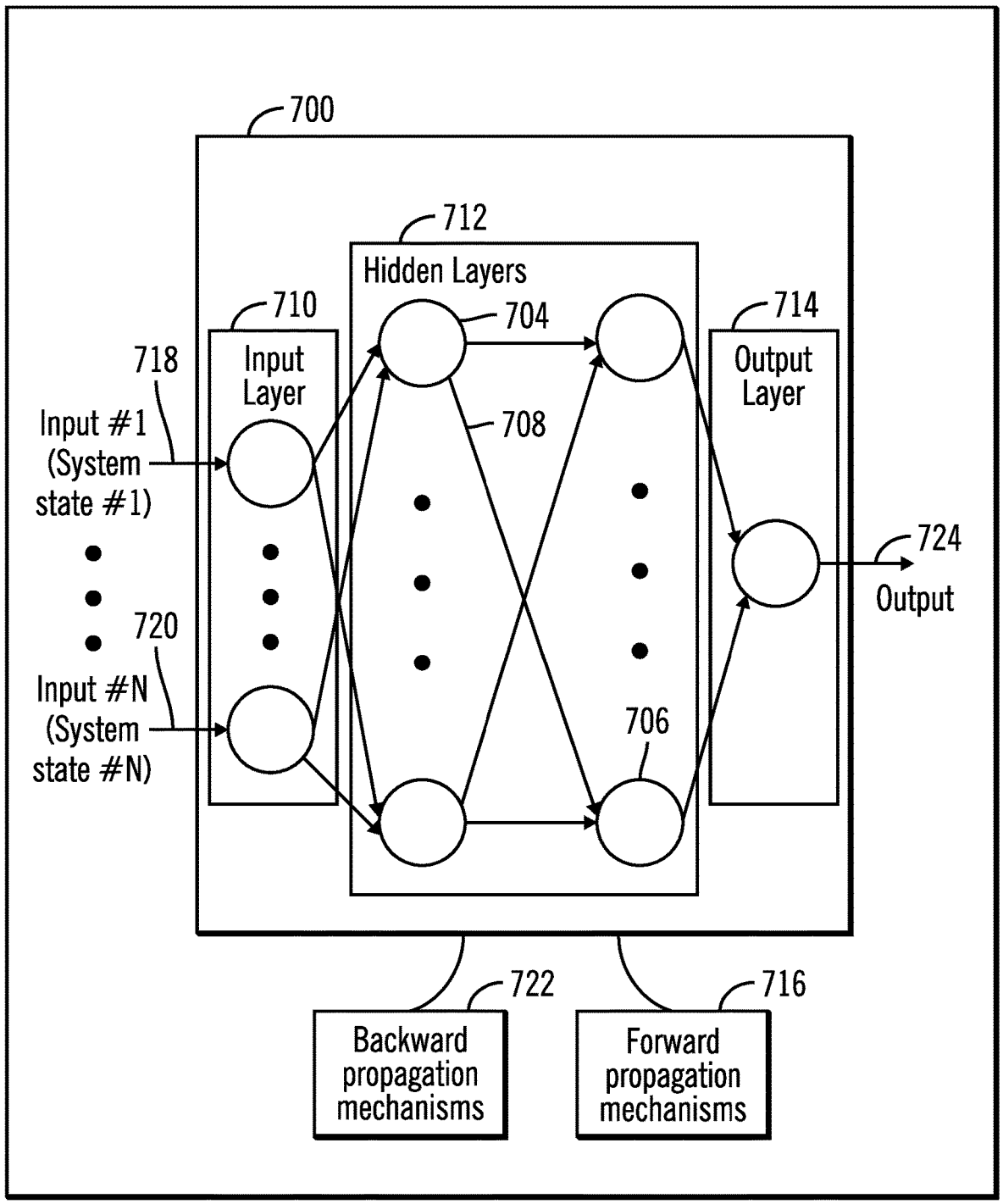
FIG. 7 illustrates, in a block diagram, details of a machine learning model in accordance with certain embodiments.

FIG. 7 illustrates, in a block diagram, details of a machine learning model 700 in accordance with certain embodiments. In certain embodiments, the one or more machine learning models 130 are implemented using the components of the machine learning model 700.

The machine learning model 700 may comprise a neural network with a collection of nodes with links connecting them, where the links are referred to as connections. For example, FIG. 7 shows a node 704 connected by a connection 708 to the node 706. The collection of nodes may be organized into three main parts: an input layer 710, one or more hidden layers 712, and an output layer 714.

The connection between one node and another is represented by a number called a weight, where the weight may be either positive (if one node excites another) or negative (if one node suppresses or inhibits another). Training the machine learning model 700 entails calibrating the weights in the machine learning model 700 via mechanisms referred to as forward propagation 716 and backward propagation 722. Bias nodes that are not connected to any previous layer may also be maintained in the machine learning model 700. A bias may be described as an extra input of 1 with a weight attached to it for a node.

In forward propagation 716, a set of weights are applied to the input data 718 . . . 720 to calculate the output 724. For the first forward propagation, the set of weights may be selected randomly or set by, for example, a system administrator. That is, in the forward propagation 716, embodiments apply a set of weights to the input data 718 . . . 720 and calculate an output 724.

In backward propagation 722 a measurement is made for a margin of error of the output 724, and the weights are adjusted to decrease the error. Backward propagation 722 compares the output that the machine learning model 700 produces with the output that the machine learning model 700 was meant to produce, and uses the difference between them to modify the weights of the connections between the nodes of the machine learning model 700, starting from the output layer 714 through the hidden layers 712 to the input layer 710, i.e., going backward in the machine learning model 700. In time, backward propagation 722 causes the machine learning model 700 to learn, reducing the difference between actual and intended output to the point where the two come very close or coincide.

The machine learning model 700 may be trained using backward propagation to adjust weights at nodes in a hidden layer to produce adjusted output values based on the provided inputs 718 . . . 720. A margin of error may be determined with respect to the actual output 724 from the machine learning model 700 and an expected output to train the machine learning model 700 to produce the desired output value based on a calculated expected output. In backward propagation, the margin of error of the output may be measured and the weights at nodes in the hidden layers 712 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 700 is configured to repeat both forward and backward propagation until the weights of the machine learning model 700 are calibrated to accurately predict an output.

The machine learning model 700 implements a machine learning technique such as decision tree learning, association rule learning, artificial neural network, inductive programming logic, support vector machines, Bayesian models, etc., to determine the output value 724.

In certain machine learning model 700 implementations, weights in a hidden layer of nodes may be assigned to these inputs to indicate their predictive quality in relation to other of the inputs based on training to reach the output value 724.

With embodiments, the machine learning model 700 is a neural network, which may be described as a collection of "neurons" with "synapses" connecting them.

With embodiments, there may be multiple hidden layers 712, with the term "deep" learning implying multiple hidden layers. Hidden layers 712 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 716 and the backward propagation 722.

In backward propagation 722, embodiments measure the margin of error of the output and adjust the weights accordingly to decrease the error.

Neural networks repeat both forward and backward propagation until the weights are calibrated to accurately predict the output 724.

In certain embodiments, the inputs to the machine learning model 700 are an application functionalities description, an application log for each application in the application landscape, and application landscape data, and the outputs of the machine learning model 700 are recommendations to enhance the application functionalities.

In certain embodiments, the inputs to the machine learning model 700 are an application functionalities description, an application log for each application in the application landscape, and application landscape data, and the outputs of the machine learning model 700 are recommendations for application developer team training.

In certain embodiments, the machine learning model may be refined based on whether the outputted recommendations, once taken, generate positive outcomes.

Figure 8:
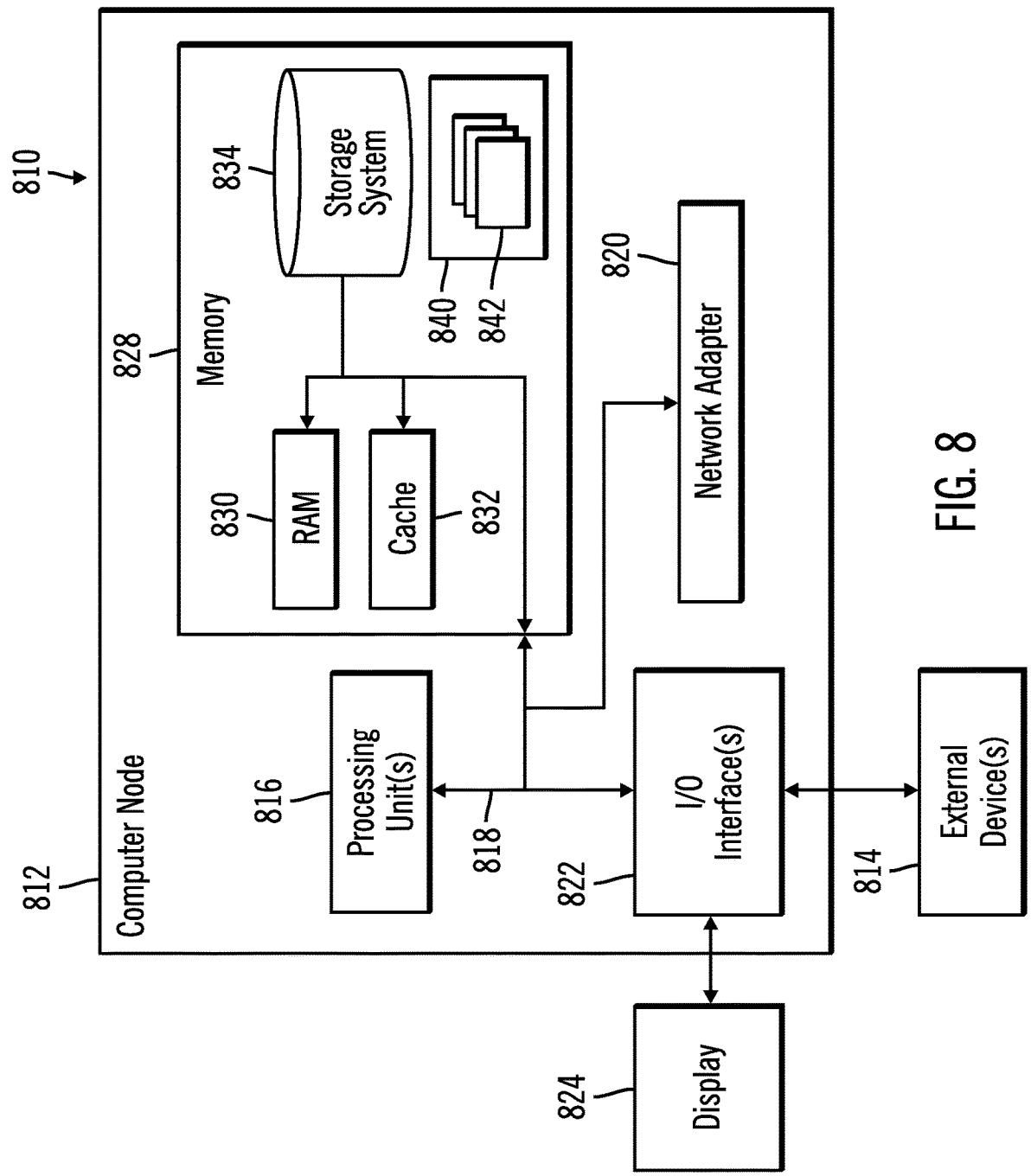
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system.

Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer node 812. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
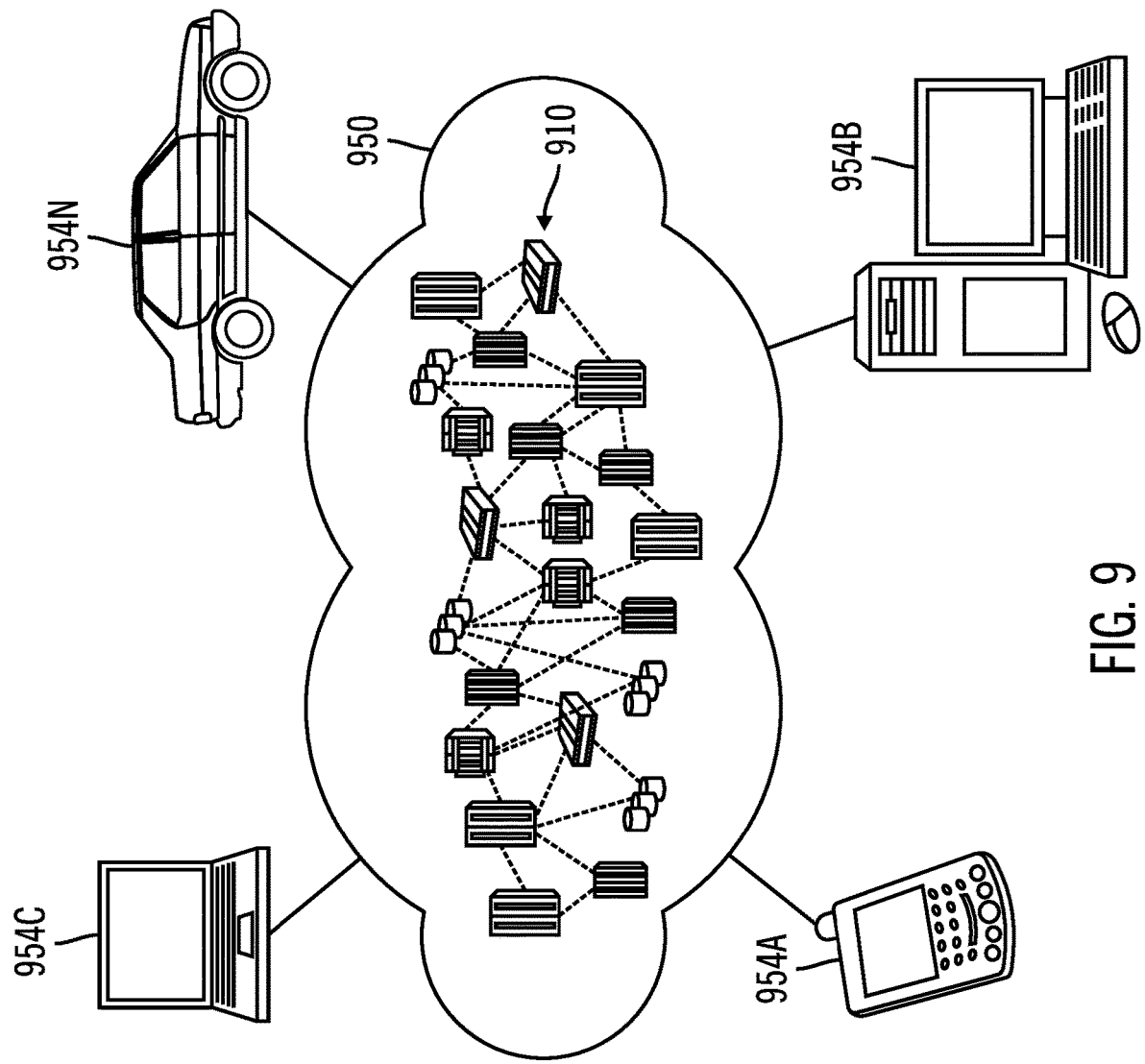
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
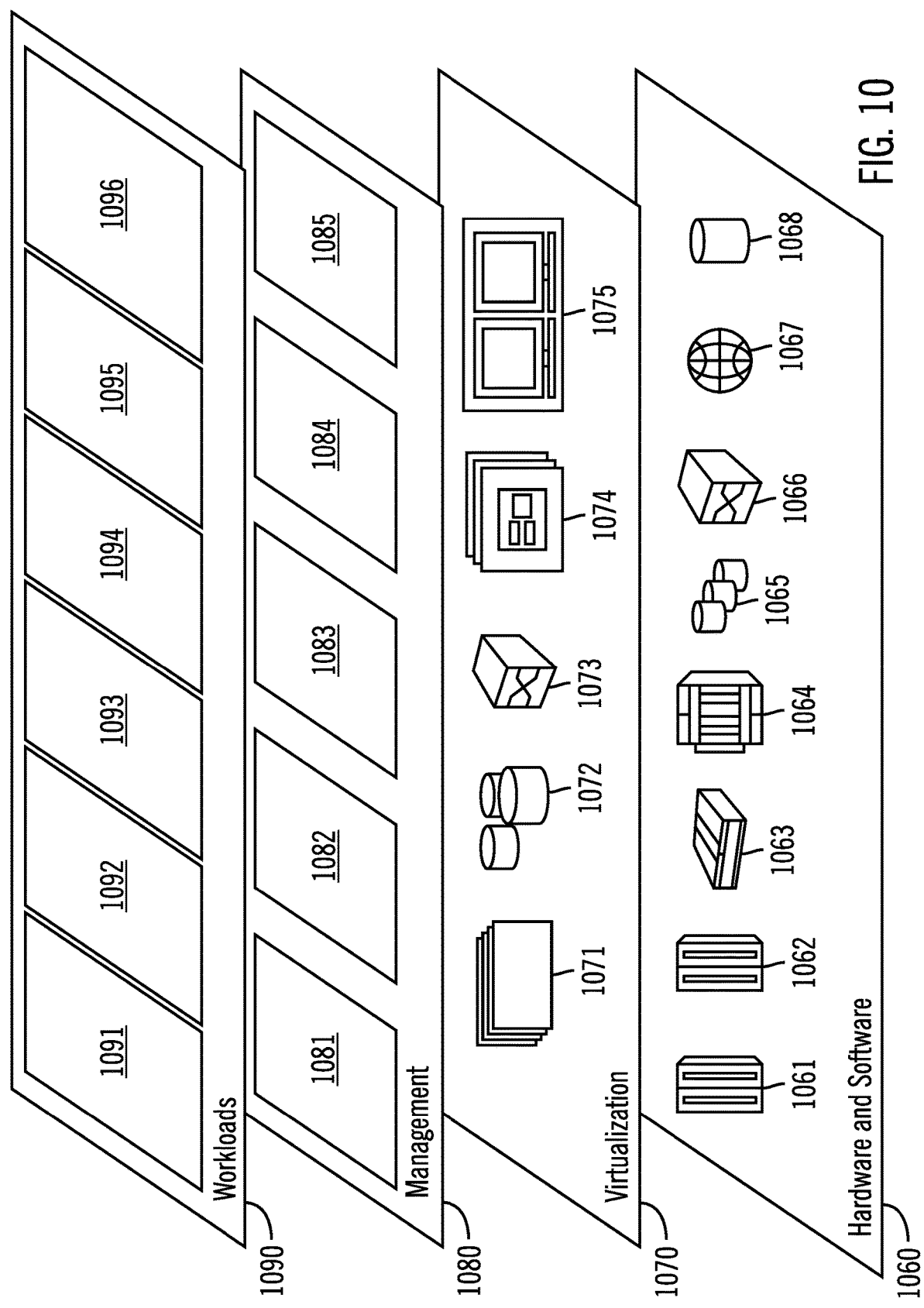
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and enhancing applications based on effectiveness scores 1096.

Thus, in certain embodiments, software or a program, implementing enhancing applications based on effectiveness scores in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
    identifying application functionalities of applications in an application landscape;
    accessing application logs and application landscape data for the applications, wherein the application landscape data comprises dependencies among the application functionalities and data sources used by the applications;
    forming groups of the application functionalities, wherein each of the groups includes different application functionalities that perform a same function;
    for a group of the groups, assigning an effectiveness score to each of the different application functionalities in the group of the groups, wherein the effectiveness score is calculated based on a time of execution that represents an execution duration for each of the different application functionalities to perform the same function and based on a type of data used by each of the different application functionalities;
    identifying one or more application functionalities in the group of the groups that has a lower effectiveness score below a threshold;
    generating a corresponding first recommendation that indicates another application functionality having a higher effectiveness score above the threshold for each of the one or more application functionalities having the lower effectiveness score by inputting the application logs and the application landscape data into a first machine learning model;
    generating a second recommendation that indicates additional skills training for a team member based on the effectiveness score assigned to each of the different application functionalities that the team member worked on by inputting the application logs and the application landscape data into a second machine learning model;
    automatically updating each of the one or more application functionalities having the lower effectiveness score based on the corresponding first recommendation; and
    executing the applications with the updated one or more application functionalities in the application landscape.

2. The computer-implemented method of claim 1, wherein at least one application functionality involves manual intervention, and wherein at least one recommendation is to automate the at least one application functionality.

3. The computer-implemented method of claim 1, wherein the effectiveness score for each of the different application functionalities is calculated based on the time of execution, the type of data, a data volume, activities to complete that application functionality, and manual involvement to complete that application functionality.

4. The computer-implemented method of claim 1, wherein a Software as a Service (SaaS) is configured to perform the operations of the computer-implemented method.

5. The computer-implemented method of claim 1, wherein the second machine learning model receives inputs of an application functionalities description, the application logs, and the application landscape data, and wherein the second machine learning model outputs the second recommendation.

6. The computer-implemented method of claim 1, wherein the first machine learning model receives inputs of an application functionalities description, the application logs, and the application landscape data, and wherein the first machine learning model outputs the corresponding first recommendation for each of the one or more application functionalities having the lower effectiveness score.

7. A computer program product, the computer program product comprising a computer readable storage medium having program code embodied therewith, the program code executable by at least one processor to perform operations for:
- identifying application functionalities of applications in an application landscape;
- accessing application logs and application landscape data for the applications, wherein the application landscape data comprises dependencies among the application functionalities and data sources used by the applications;
- forming groups of the application functionalities, wherein each of the groups includes different application functionalities that perform a same function;
- for a group of the groups, assigning an effectiveness score to each of the different application functionalities in the group of the groups, wherein the effectiveness score is calculated based on a time of execution that represents an execution duration for each of the different application functionalities to perform the same function and based on a type of data used by each of the different application functionalities;
- identifying one or more application functionalities in the group of the groups that has a lower effectiveness score below a threshold;
- generating a corresponding first recommendation that indicates another application functionality having a higher effectiveness score above the threshold for each of the one or more application functionalities having the lower effectiveness score by inputting the application logs and the application landscape data into a first machine learning model;
- generating a second recommendation that indicates additional skills training for a team member based on the effectiveness score assigned to each of the different application functionalities that the team member worked on by inputting the application logs and the application landscape data into a second machine learning model;
- automatically updating each of the one or more application functionalities having the lower effectiveness score based on the corresponding first recommendation; and
- executing the applications with the updated one or more application functionalities in the application landscape.

8. The computer program product of claim 7, wherein at least one application functionality involves manual intervention, and wherein at least one recommendation is to automate the at least one application functionality.

9. The computer program product of claim 7, wherein the effectiveness score for each of the different application functionalities is calculated based on the time of execution, the type of data, a data volume, activities to complete that application functionality, and manual involvement to complete that application functionality.

10. The computer program product of claim 7, wherein a Software as a Service (SaaS) is configured to perform the operations of the computer program product.

11. The computer program product of claim 7, wherein the second machine learning model receives inputs of an application functionalities description, the application logs, and the application landscape data, and wherein the second machine learning model outputs the second recommendation.

12. The computer program product of claim 7, wherein the first machine learning model receives inputs of an application functionalities description, the application logs, and the application landscape data, and wherein the first machine learning model outputs the corresponding first recommendation for each of the one or more application functionalities having the lower effectiveness score.

13. A computer system, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more computer-readable memories, to perform operations comprising:
- identifying application functionalities of applications in an application landscape;
- accessing application logs and application landscape data for the applications, wherein the application landscape data comprises dependencies among the application functionalities and data sources used by the applications;
- forming groups of the application functionalities, wherein each of the groups includes different application functionalities that perform a same function;
- for a group of the groups, assigning an effectiveness score to each of the different application functionalities in the group of the groups, wherein the effectiveness score is calculated based on a time of execution that represents an execution duration for each of the different application functionalities to perform the same function and based on a type of data used by each of the different application functionalities;
- identifying one or more application functionalities in the group of the groups that has a lower effectiveness score below a threshold;
- generating a corresponding first recommendation that indicates another application functionality having a higher effectiveness score above the threshold for each of the one or more application functionalities having the lower effectiveness score by inputting the application logs and the application landscape data into a first machine learning model;
- generating a second recommendation that indicates additional skills training for a team member based on the effectiveness score assigned to each of the different application functionalities that the team member worked on by inputting the application logs and the application landscape data into a second machine learning model;
- automatically updating each of the one or more application functionalities having the lower effectiveness score based on the corresponding first recommendation; and
- executing the applications with the updated one or more application functionalities in the application landscape.

14. The computer system of claim 13, wherein at least one application functionality involves manual intervention, and wherein at least one recommendation is to automate the at least one application functionality.

15. The computer system of claim 13, wherein the effectiveness score for each of the different application functionalities is calculated based on the time of execution, the type of data, a data volume, activities to complete that application functionality, and manual involvement to complete that application functionality.

16. The computer system of claim 13, wherein a Software as a Service (SaaS) is configured to perform the operations of the computer system.

17. The computer system of claim 13, wherein the second machine learning model receives inputs of an application functionalities description, the application logs, and the application landscape data, and wherein the second machine learning model outputs the second recommendation.

18. The computer system of claim 13, wherein the first machine learning model receives inputs of an application functionalities description, the application logs, and the application landscape data, and wherein the first machine learning model outputs the corresponding first recommendation for each of the one or more application functionalities having the lower effectiveness score.

* * * * *